(12) United States Patent
Stolyarov et al.

(10) Patent No.: US 8,775,966 B2
(45) Date of Patent: Jul. 8, 2014

(54) ELECTRONIC DEVICE AND METHOD WITH DUAL MODE REAR TOUCHPAD

(75) Inventors: Denis B Stolyarov, Northbrook, IL (US); Hoi L Young, Lake Villa, IL (US)

(73) Assignee: Motorola Mobility LLC, Chicago, IL (US)

( * ) Notice: Subject to any disclaimer, the term of this patent is extended or adjusted under 35 U.S.C. 154(b) by 103 days.

(21) Appl. No.: 13/172,430

(22) Filed: Jun. 29, 2011

(65) Prior Publication Data

US 2013/0007653 A1    Jan. 3, 2013

(51) Int. Cl.
*G06F 3/048* (2013.01)

(52) U.S. Cl.
USPC .......................................................... 715/784

(58) Field of Classification Search
USPC .......................... 715/764, 723, 762; 707/722
See application file for complete search history.

(56) References Cited

U.S. PATENT DOCUMENTS

| | | |
|---|---|---|
| 5,543,588 A | 8/1996 | Bisset et al. |
| 5,648,642 A | 7/1997 | Miller et al. |
| 5,729,219 A | 3/1998 | Armstrong et al. |
| 5,896,575 A | 4/1999 | Higginbotham et al. |
| 5,959,260 A | 9/1999 | Hoghooghi et al. |
| 6,020,878 A | 2/2000 | Robinson |
| 6,067,074 A | 5/2000 | Lueders |
| 6,633,310 B1 | 10/2003 | Andrew et al. |
| 6,944,472 B1 | 9/2005 | Ishigami |
| 6,981,227 B1 | 12/2005 | Taylor |
| 7,009,599 B2 | 3/2006 | Pihlaja |
| 7,012,595 B2 | 3/2006 | Lu |
| 7,075,513 B2 | 7/2006 | Silfverberg et al. |
| 7,088,342 B2 | 8/2006 | Rekimoto et al. |
| 7,123,243 B2 | 10/2006 | Kawasaki et al. |

(Continued)

FOREIGN PATENT DOCUMENTS

| | | |
|---|---|---|
| EP | 1408400 A2 | 4/2004 |
| GB | 2344905 A | 6/2000 |

(Continued)

OTHER PUBLICATIONS

Patent Cooperation Treaty, "PCT Search Report and Written Opinion of the International Searching Authority" for International Application No. PCT/US2012/043053, Oct. 23, 2012, 14 pages.

(Continued)

*Primary Examiner* — William Bashore
*Assistant Examiner* — Rayeez Chowdhury
(74) *Attorney, Agent, or Firm* — Ingrassia Fisher & Lorenz, PC; Chad C. Anderson; Sylvia Chen

(57) ABSTRACT

A method is provided in a user interface of an electronic device with a touch screen display with a first touch-sensitive surface on a first side and a second touch-sensitive surface on a second side. The method includes operating the device in a default mode; receiving a predetermined first touch input while in the default mode; enabling a navigation mode on the second touch-sensitive surface based on the receiving the predetermined first touch input; navigating through an image on the a touch screen display based on a further touch input on the second touch-sensitive surface while in the navigation mode; and disabling the navigation mode on the second touch-sensitive surface and operating the electronic device in the default mode based on a predetermined second touch input.

21 Claims, 10 Drawing Sheets

(56) References Cited

U.S. PATENT DOCUMENTS

| | | | |
|---|---|---|---|
| 7,219,308 B2 | 5/2007 | Novak et al. | |
| 7,340,271 B2 | 3/2008 | Mirza et al. | |
| 7,403,192 B2 | 7/2008 | Lai | |
| 7,479,947 B2 | 1/2009 | Pihlaja | |
| 8,266,550 B1 * | 9/2012 | Cleron et al. | 715/863 |
| 2003/0095095 A1 | 5/2003 | Pihlaja | |
| 2003/0174072 A1 | 9/2003 | Salomon | |
| 2003/0184528 A1 | 10/2003 | Kawasaki et al. | |
| 2003/0202015 A1 | 10/2003 | Battles et al. | |
| 2003/0234768 A1 | 12/2003 | Rekimoto et al. | |
| 2004/0021681 A1 * | 2/2004 | Liao | 345/702 |
| 2004/0106439 A1 | 6/2004 | Garroch | |
| 2004/0207766 A1 | 10/2004 | Sata et al. | |
| 2004/0243747 A1 | 12/2004 | Rekimoto | |
| 2004/0263484 A1 | 12/2004 | Mantysalo et al. | |
| 2005/0012723 A1 | 1/2005 | Pallakoff | |
| 2005/0246652 A1 | 11/2005 | Morris | |
| 2005/0264540 A1 | 12/2005 | Niwa | |
| 2006/0084482 A1 | 4/2006 | Saila | |
| 2006/0097983 A1 | 5/2006 | Haggman et al. | |
| 2006/0125799 A1 * | 6/2006 | Hillis et al. | 345/173 |
| 2006/0197750 A1 | 9/2006 | Kerr et al. | |
| 2006/0271875 A1 | 11/2006 | Green et al. | |
| 2007/0063969 A1 | 3/2007 | Wright | |
| 2007/0097151 A1 | 5/2007 | Rosenberg | |
| 2007/0103454 A1 * | 5/2007 | Elias | 345/173 |
| 2008/0088602 A1 | 4/2008 | Hotelling | |
| 2009/0166098 A1 | 7/2009 | Sunder | |
| 2009/0256809 A1 | 10/2009 | Minor | |
| 2009/0259969 A1 | 10/2009 | Pallakoff | |
| 2010/0277420 A1 | 11/2010 | Charlier et al. | |
| 2010/0277421 A1 | 11/2010 | Charlier et al. | |
| 2010/0277439 A1 | 11/2010 | Charlier et al. | |
| 2010/0302179 A1 * | 12/2010 | Ahn et al. | 345/173 |
| 2011/0012921 A1 | 1/2011 | Cholewin et al. | |
| 2011/0012928 A1 | 1/2011 | Cholewin et al. | |
| 2011/0193805 A1 * | 8/2011 | Park et al. | 345/173 |
| 2011/0210922 A1 * | 9/2011 | Griffin | 345/173 |
| 2012/0054672 A1 * | 3/2012 | McDowell | 715/784 |

FOREIGN PATENT DOCUMENTS

| | | |
|---|---|---|
| GB | 2393688 A | 4/2004 |
| JP | 2000163031 A | 6/2000 |
| JP | 2002342033 A2 | 11/2002 |
| WO | 02079958 A2 | 10/2002 |
| WO | 2005008444 A2 | 1/2005 |
| WO | 2006043210 A2 | 4/2006 |
| WO | 2008085760 A2 | 7/2008 |
| WO | 2009127916 A2 | 10/2009 |

OTHER PUBLICATIONS

Masanori Sugimoto and Keiichi Hiroki, "HybridTouch: An Intuitive Manipulation Technique for PDAs Using Their Front and Rear Surfaces", Proceedings of the 8th Int'l Conference on Human-Computer Interaction with Mobile Devices and Services (MobileHCI 2006); Sep. 12-15, 2006, pp. 137-140.

Patrick Baudisch and Gerry Chu, "Back-of-Device Interaction Allows Creating Very Small Touch Devices", Proceedings of the SIGCHI Conference on Human Factors in Computing Systems (CHI 2009), Apr. 9, 2009, pp. 1923-1932.

Jef Raskin, The Humane Interface, 2000 as summarized in Wikipedia. "The Humane Interface", Jun. 7, 2011.

* cited by examiner

ELECTRONIC DEVICE AND METHOD WITH DUAL MODE REAR TOUCHPAD

TECHNICAL FIELD

The present disclosure is directed to electronic devices and methods for controlling electronic devices with both touch screens and touch pads.

BACKGROUND

Modern electronic devices include increasing functionality as technologies converge on single platforms. For example, computers, mobile phones, personal digital assistants, music players, video players, televisions, and network technology are being encompassed on a single device. These devices are being built smaller and smaller, and they may incorporate multiple input mechanisms such as one or more keys and a touch-screen as well as proximity and image-based input components.

Some electronic devices use touch screen displays for displaying information and for various input functions, including entering data, manipulating icons and images, navigating windows and images, and the like. With the number of functions implemented by the device increasing and the size of the device decreasing, some devices add more touch-sensitive components to simplify and enhance a user's experience such as joysticks, touchpads, and other touch-sensitive surfaces. Ironically, some of these input components may be confusing or inconvenient for a person to use and, instead of creating a better user experience, lead to erroneous (false) inputs and cause user frustration.

Accordingly, it is desirable to provide more efficient operation of electronic devices for improved user experience. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments disclosed herein provide an electronic device and a method for controlling the electronic device that includes both a touch screen display and a touch pad. The user may perform various functions based on inputs at the touch screen display and/or the touch pad depending on the mode of the device. For example, in a default touch pad mode, the user may scroll or page through images displayed on the touch screen display based on inputs via the touch pad. Even though use of a rear or side touch pad offers an unobstructed view of a front touch screen display, typically the functionality of a rear touch pad is limited in the default mode because rear touch interaction can often be inadvertent or inaccurate—especially with handheld devices.

Upon detection of a first predetermined user input, the device activates a navigation touch pad mode in which the user may trigger a number of additional functions via the rear touch pad, including positioning a pointer icon on a static image, selecting a portion of the static image, positioning a cursor for editing, panning the image, and/or zooming on the image. A second predetermined user input, such as any touch input on the front touch screen display or a predetermined touch input on the rear touch pad, cancels the navigation mode such that the device returns to the default touch pad mode. Another example of a second predetermined user input may be the completion of the intended navigation mode task, such as a selection of a displayed hyperlink or a completed entry of information, from either the front touch screen or from the rear touch pad. Input inactivity for a predetermined period of time may also cancel the navigation mode to avoid user confusion about the current mode of the device after a delay in use.

As such, exemplary embodiments described below increase the utility of a rear touch pad while reducing inadvertent inputs caused by unintentional contact on the rear of the device. Moreover, in the navigation mode, a pointer icon may appear on the front display screen depicting the functional position of the user interaction on the rear touch pad. This provides more intuitive control of the device via the rear touch pad, particularly when the touch pad is implemented to have relative opposite directions of the gestures and displayed interactions, and because the user's finger otherwise cannot be directly viewed underneath the device.

Figure 1:
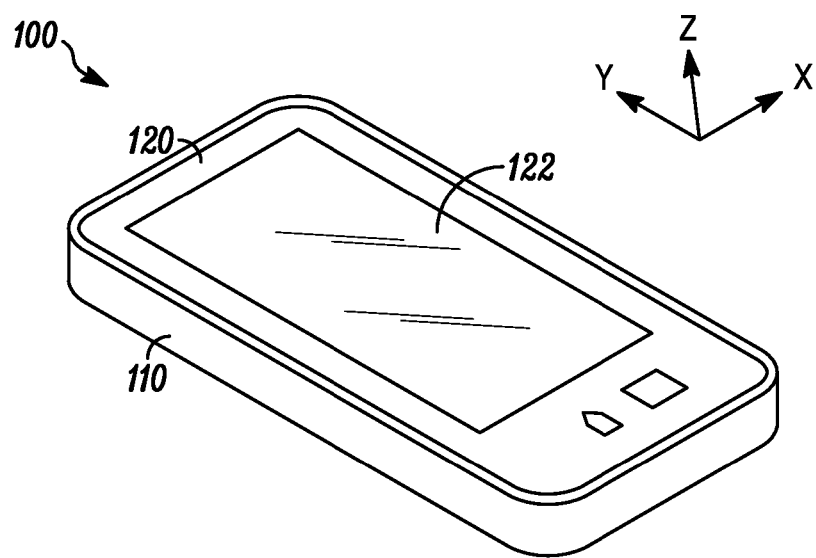
FIG. 1 is a front perspective view of an electronic device according to an exemplary embodiment.

FIG. 1 is a front perspective view of an electronic device 100 according to an exemplary embodiment. The device 100 may be, for example, a handheld wireless device, such as a mobile phone, a Personal Digital Assistant (PDA), a smart phone, tablet or laptop computer, a multimedia player, a MP3 player, a digital broadcast receiver, remote controller, or any other electronic apparatus. Many embodiments may be portable and hand-held, but this is not required. In one exemplary embodiment, the device 100 is a cellular phone that exchanges information with a network (not shown). In another embodiment, the device 100 may be, for example, an electronic book (eBook).

The device 100 includes an electronic device housing 110. The housing 110 may include a front (obverse or first) housing face 120. In general, the front housing face 120 is the surface that faces the user during active use.

The device 100 further includes a touch screen display (or first touch sensitive surface) 122 positioned on the front housing face 120. The front touch screen display 122 is integrated into the front housing face 120 and is configured as both a display screen and a manual user interface. In this way, the user may view displayed information and provide manual touch inputs upon the front touch screen display 122. In one exemplary embodiment, the front touch screen display 122 may be a capacitive sensor touch screen display. The front touch screen display 122 may also be a resistive touch screen, an inductive touch screen, a surface acoustic wave touch screen, an infrared touch screen, a strain gauge touch screen, an optical imaging touch screen, a dispersive signal technology touch screen, a proximity type touch screen, or any other touch screen that can be used on an electronic device and support single and/or multi-touch user inputs. Although not described, the housing 110 may support any number of additional user input structures, including buttons, switches, keyboards, joystick, and the like.

Figure 2:
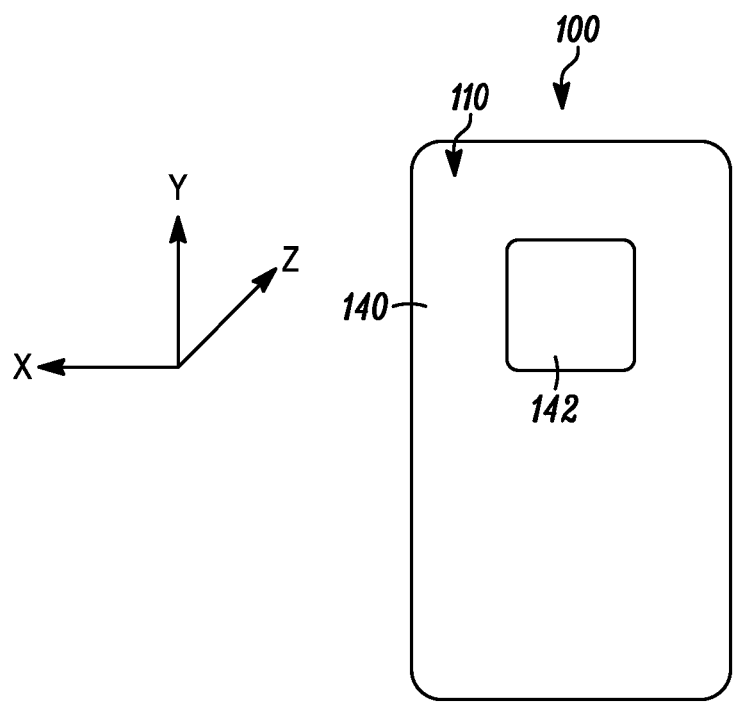
FIG. 2 is a rear view of the electronic device of FIG. 1 according to an exemplary embodiment.

FIG. 2 is a rear view of the device 100 of FIG. 1 according to an exemplary embodiment. FIG. 2 particularly illustrates a rear (reverse or second) housing face 140 of the housing 110 that is substantially opposite the front housing face 120 of FIG. 1. A rear touch pad 142 is positioned on the rear housing face 140 and is configured as another user interface. The rear touch pad 142 may be a capacitive sensor touch pad, a resistive touch pad, an inductive touch pad, a surface acoustic wave touch pad, an infrared touch pad, a strain gauge touch pad, an optical imaging touch pad, a dispersive signal technology touch pad, or any other touch pad that can be used on a handheld electronic device and support single and/or multi-touch user inputs.

Referring now to FIGS. 1 and 2, the front touch screen display 122 and rear touch pad 142 are configured to receive various touch inputs for operating the device 100, including operating the device 100 in a number of touch pad modes in which varying functions are implemented or executed via the rear touch pad. Although the front touch screen display 122 is described as being on the front housing face 120 and the rear touch pad 142 is described as being on the rear housing face 140, the positions of front touch screen display 122 and the rear touch pad 142 may be reversed or incorporated onto a common side. Alternately, the touch pad may be positioned on a side (lateral) housing face relative to the front touch screen display 122. Also, the touch pad may be positioned on another housing element, such as a cover housing element (not shown). Additionally, the front touch screen display 122 or rear touch pad 142 may each be a composite of two or more touch sensitive surfaces to receive, for example, multi-touch gestures or provide additional functionality.

In general, the device 100 may be sized to be supported in the hand of the user such that a first digit of the supporting hand provides inputs on the rear touch pad 142 while another digit of the supporting hand or a digit of the other hand provides inputs on the front touch screen display 122. For example, the thumb of the user may actuate the front touch screen display 122 while the index finger may actuate the rear touch pad 142. Such inputs at the front touch screen display 122 and/or the rear touch pad 142 may be functions associated with a picture viewer application, a view finder application, a web browser application, a map application, a media player application, a phonebook application, or any other application. The input actuation may be based on tap inputs, gesture inputs, or combinations of inputs on the front touch screen display 122 and/or rear touch pad 142. For example a tap input can be a temporary press on the front touch screen display 122 and/or rear touch pad 142 and a gesture may be a single or double point sliding input or multiple sliding inputs on the front touch screen display 122 and/or rear touch pad 142. The gestures can be substantially linear gestures along a horizontal or vertical axis, gestures at an angle to a horizontal or vertical axis, arced gestures, or gestures that are a combination of horizontal, vertical, angled, and/or arced gestures.

In general and as noted above, the user inputs on the front touch screen display 122 and/or rear touch pad 142 control the operation of the device 100 in one of a number of predetermined modes, each of which may include a set of functions such as data entry, icon selection, highlighting, copying, cutting or pasting of an image or text, and zooming, moving, rotating, and otherwise manipulating an image on the touch screen display 122. Other functions include media player control function, a contact or directory function, search function, camera actuation, internet browsing, and telephone functions. At least some of the functions associated with the front touch screen display 122 and the rear touch pad 142, as well as the interaction thereof, are discussed in further detail below.

Figure 3:
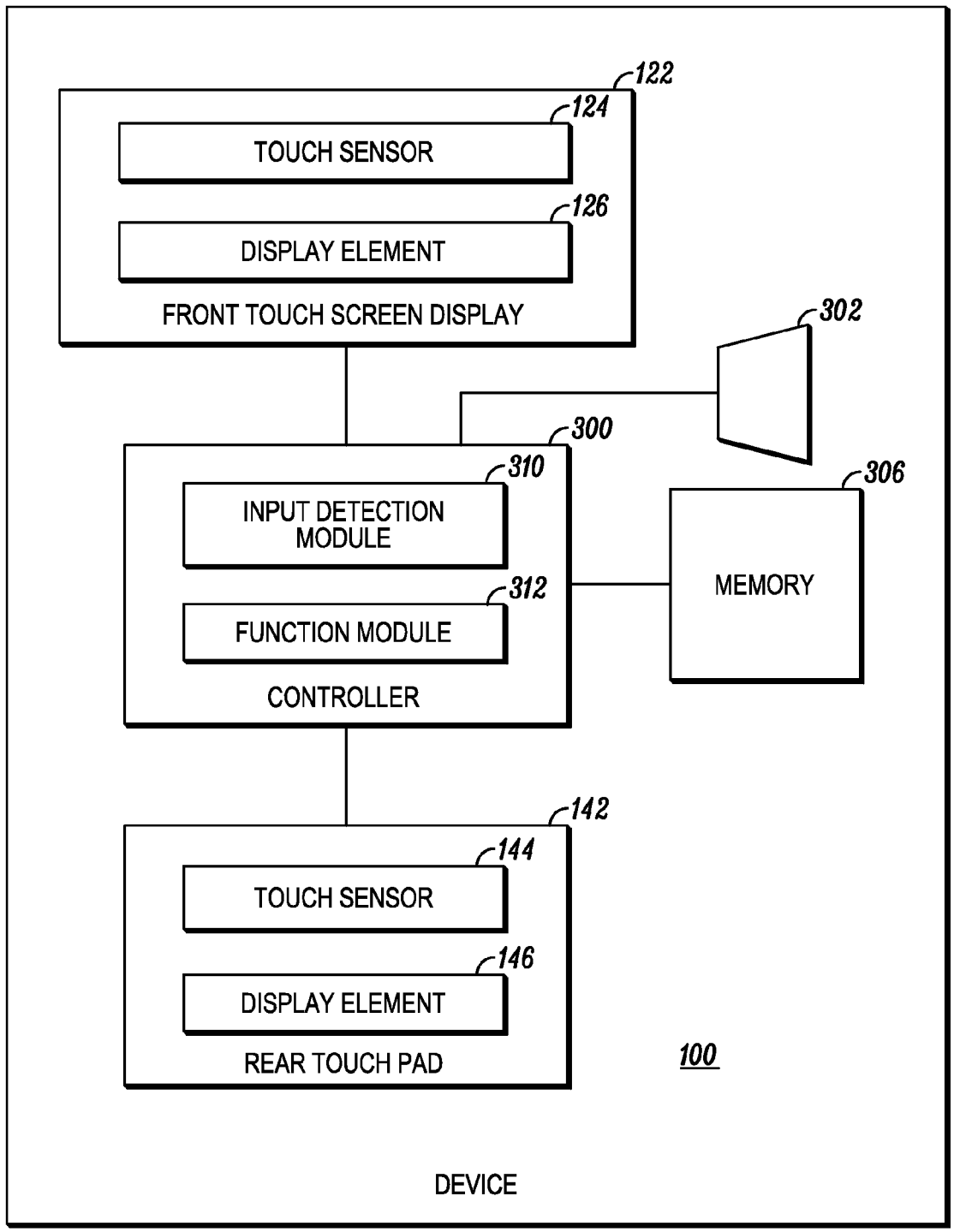
FIG. 3 is a block diagram of the electronic device of FIGS. 1 and 2 according to an exemplary embodiment.

FIG. 3 is an exemplary block diagram of a device 100, such as the device 100 of FIGS. 1 and 2. As introduced above, the device 100 includes the front touch screen display 122 and the rear touch pad 142. As shown, the front touch screen display 122 is generally on a front side of the device 100 and the rear touch pad 142 is generally on a rear side of the device 100. In other embodiments, however, the rear touch pad 142 may be on the top of the device 100, the bottom of the device 100, another surface of the device 100, or even on a common side of the device 100 along with the touch screen display 122. As noted previously, the front touch screen display 122 and rear touch pad 142 are examples of touch-sensitive surfaces. As such, the front touch screen display 122 includes a touch sensor 124 and a display element 126, and the rear touch pad 142 includes a touch sensor 144. As noted above, the touch sensors 124 and 144 may be capacitive sensors, resistive sensors, or any other type of sensors configured to detect user actuation. In general, the front touch screen display 122 and rear touch pad 142 are configured to receive user actuation by detecting the position, movement, and/or force that make up the user input. The display element 126 may include a liquid crystal display (LCD) or other suitable device to display information or an image to the user to support the functions discussed herein. As also shown in FIG. 3, the rear touch pad 142 may optionally include a display element 146 to display information or an image for the user. As an example, the display element 146 may display an indication about the current mode of the device 100, such as an icon or a particular color of light emitting diode (LED).

The device 100 further includes a controller 300 coupled to the front touch screen display 122 and the rear touch pad 142. In general, the controller 300 is implemented as a processor, computer, integrated circuit, or the like controlled by software or firmware. The controller 300 includes an input detection module 310 to obtain and interpret location and force information from the front touch screen display 122 and rear touch pad 142. In turn, a function module 312 of the controller 300 evaluates the input and implements the appropriate functions in accordance with the input, including directing display signals to the display element 126, haptic signals to a vibration component (not shown), and/or audio signals to an audio speaker 302. In one exemplary embodiment, the function module 312 may control the operation of the device in a default mode or a navigation mode based on the inputs received on the front touch screen display 122 and the rear touch pad 142.

A memory 306, coupled to the controller 300, stores software programs for performing the functions described herein, including operation of the device 100, an operating system, various application programs, and data files. The memory 306 can include one or more forms of volatile and/or non-volatile, fixed and/or removable memory, such as read-only memory (ROM), electronic programmable read-only memory (EPROM), random access memory (RAM), and erasable electronic programmable read-only memory (EEPROM).

The device 100 may also include a variety of other components (not shown) based on the particular implementation. For example, if the device 100 is implemented as a mobile phone, it would also include a microphone and a wireless transceiver and possibly additional input components such as a keypad, accelerometer, and vibration alert. If the device 100 is implemented as a remote controller, an infrared transmitter could also be included.

Figure 4:
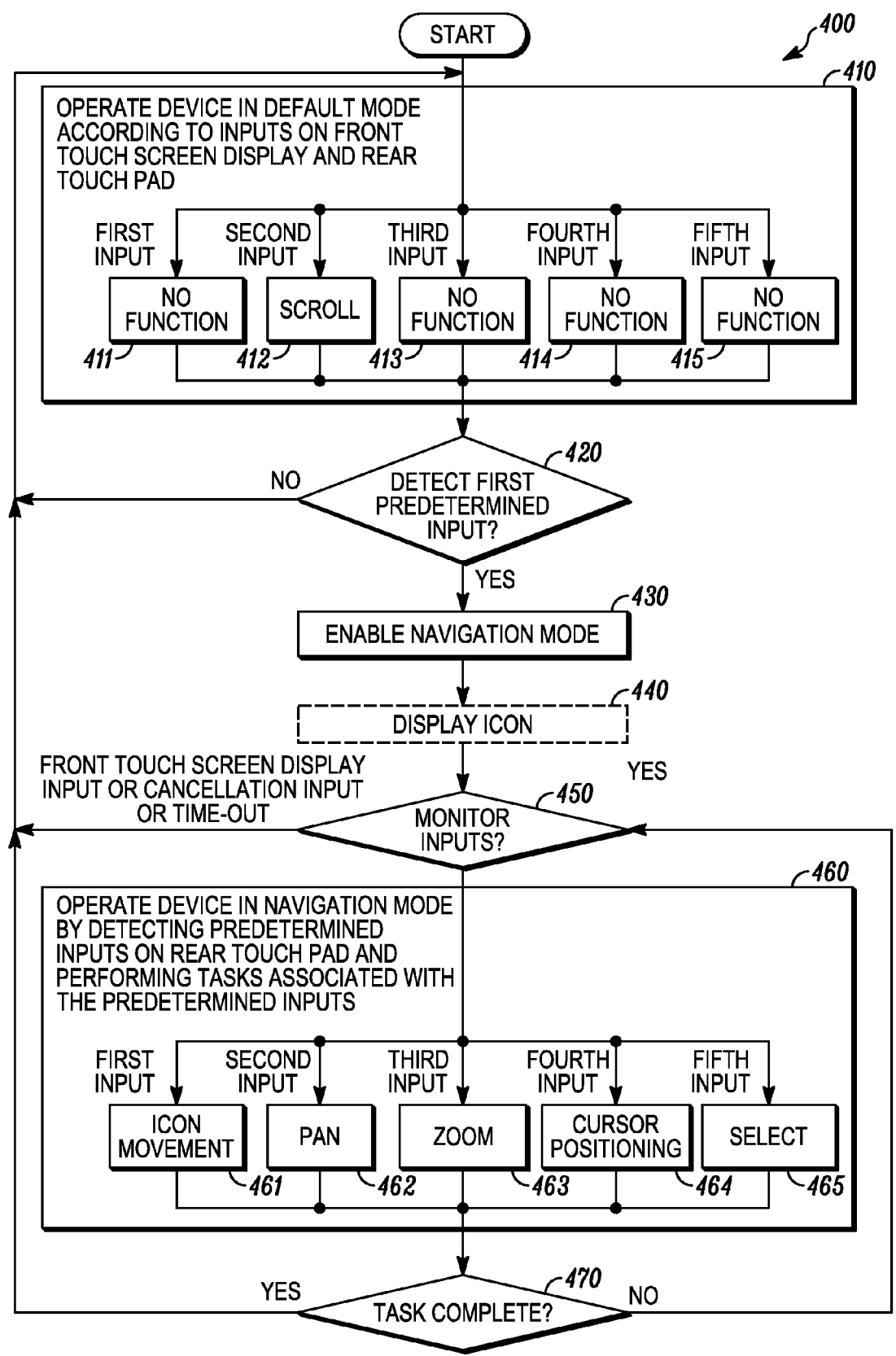
FIG. 4 is a flow diagram of a method for controlling the electronic device of FIGS. 1-3 according to an exemplary embodiment.

Now that the components of the device 100 have been generally described, a more detailed description of the operation of the device 100 with the front touch screen display 122 and rear touch pad 142 will be provided. FIG. 4 is an exemplary flow diagram 400 illustrating a method of operating of the device 100 according to an exemplary embodiment. At step 410, the device 100 operates in a first or default mode in which the controller 300 controls the device 100 based on the user inputs on the front touch screen display 122. In general, any function of the device 100 may be controlled by inputs on the front touch screen display 122, including navigating, selecting, scrolling, and the like.

In step 410, in a default touch pad mode, the controller 300 may also enable limited control of the device 100 based on inputs at the rear touch pad 142. As described below, in the default mode, the rear touch pad 142 is typically used for scrolling. As noted above, the inputs may be formed from any type of gesture or combination of gestures, including single- and multi-finger glides and taps. As represented by the parallel substeps 411, 412, 413, 414, and 415 within step 410, the inputs received on the rear touch pad 142 may be categorized as first, second, third, fourth, and fifth inputs that respectively result in different functions. During implementation, any gesture or input mapping scheme may be provided for a desired function. However, in this example, a single-finger glide corresponds to the first input; a single-finger extended glide corresponds to the second input; a double-finger glide corresponds to the third input; a tap corresponds to the fourth input; and a double tap corresponds to the fifth input. An "extended glide" is a touch gesture that contacts a perimeter of the touch-sensitive surface and stays in contact with the perimeter for at least a set period of time. A non-extended glide does not stay in contact with the perimeter of the touch-sensitive surface for the predetermined period of time.

As shown in substeps 411, 412, 413, 414, and 415, the functionality of the rear touch pad 142 is limited. Particularly, only the second input (e.g., a single-finger extended glide) in substep 412 results in the performance of a function (e.g., scrolling or paging) on the device 100. The remaining inputs in substeps 411, 413, 414, and 415 are generally ignored by the controller 300. Note that additional or alternate gestures may be defined. For example, the controller 300 may distinguish between a double-fingered tap (a tap using two fingers) and a double tap (two sequential taps presumably using one finger). Also, while this example ignores four of the five defined gestures, other implementations may define different numbers of gestures and/or direct fewer gestures to be ignored.

Figure 5:
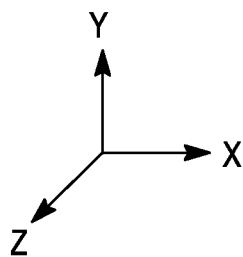
FIG. 5 is a front view of the electronic device of FIGS. 1-3 displaying an image in a default mode.
Figure 6:
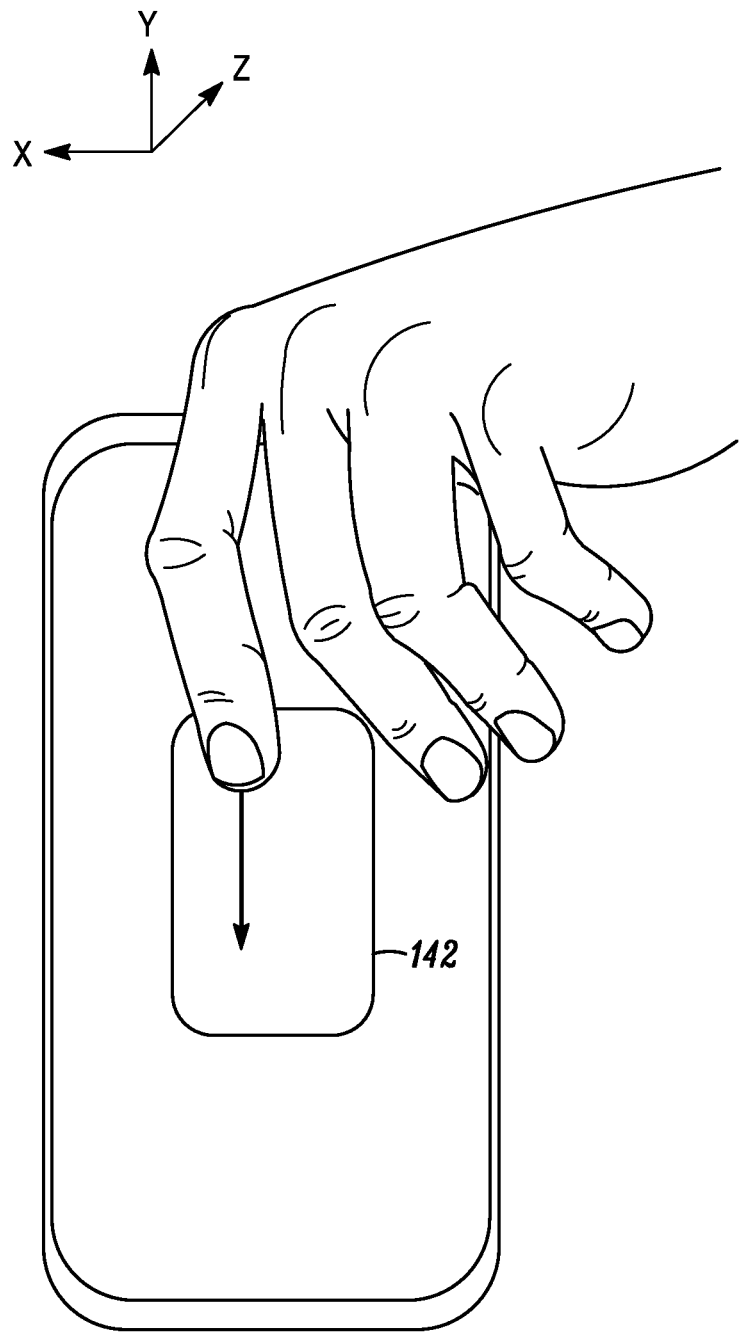
FIG. 6 is a rear view of a user manipulating the image on the electronic device of FIG. 5 in the default mode.
Figure 7:
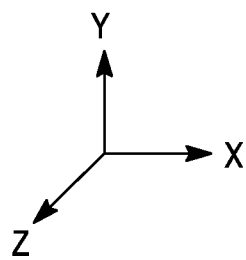
FIG. 7 is a front view of the electronic device of FIG. 5 in the default mode after the user input of FIG. 6.

Reference is briefly made to FIGS. 5-7, which illustrate operation of the device 100, and particularly a user's interaction through the rear touch pad 142, in the default touch pad mode. As an example, FIG. 5 is a view of the front side of the device 100 displaying a list of contacts on the front touch screen display 122. FIG. 6 is a view of the rear side of the device 100 being held by a user. The user may manipulate the rear touch pad 142 to scroll up and down the contacts list. For example, when the user glides a finger on the rear touch pad 142 in the direction of the depicted arrow (in a negative y-axis direction), the list of contacts scrolls in the upwards direction (in a positive y-axis direction). FIG. 7 is a view of the front side of the device 100 that illustrates the results of the user input of FIG. 6. With reference to FIG. 4, the controller 300 recognizes the second input in substep 412 and scrolls the displayed image accordingly. In this example, the controller scrolls the image within the single, active application shown. Other embodiments may use the same gesture (e.g., an extended glide) or a different gesture (e.g., a two-fingered extended glide) to page between images within a single, active application (e.g., an electronic book application or a photo gallery application) or use a different gesture (e.g., a three-finger extended glide) to switch between active applications.

As such, as shown in FIGS. 5-7, the rear touch pad 142 is typically used for scrolling or paging functions on the images displayed on the front touch screen display 122, although any function may be provided. Note that, in this implementation, a downward glide (in the negative y-axis direction) on the touch pad 142 results in an upward scroll (in the positive y-axis direction) of the image on the front touch screen display 122. An alternate implementation could be to have a downward glide on the touch pad result in a downward scroll on the front touch screen.

In other implementations, glides on the rear touch pad in other directions may direct scrolling of the image(s) on the front touch screen display. For example, a glide to the left (in the negative x-axis direction) may result in a forward "page turn" (e.g., advancing a page of an electronic book application) while a glide to the right (in the positive x-axis direction) may result in a reverse "page turn". Diagonal glides may pan the image across the touch screen display, and other types of gestures may direct yet other functions as dictated by the application.

Returning to FIG. 4, in step 420, the device 100 monitors inputs received from the user for a first predetermined input. The first predetermined input may be any suitable input, such as a "figure 8" input on the front touch screen display 122 or the rear touch pad 142, a double tap input on the rear touch pad, or a press-and-hold input on the rear touch pad 142 that indicates a user intention to modify the operating mode. The first predetermined input may also be an icon-press on the front touch screen display 122, a press of a hard key on the device, or an accelerometer detected motion (e.g., a tilt or shake). If the first predetermined input is not received, the flow diagram 400 returns to step 410 and the device 100 continues to operate in the default mode.

If, however, the first predetermined input is detected in step 420, the flow diagram 400 proceeds to step 430 and the device 100 operates in a second touch pad mode, particularly in a navigation touch pad mode. As described in greater detail below, the navigation mode may provide a different group of functions for the rear touch pad 142 relative to the default touch pad mode. In optional step 440, a specific pointer icon may be displayed on the front touch screen display 122 when the device 100 is in the navigation mode to provide a visual indication to the user of activation of the navigation mode and a reference for subsequent inputs. In one exemplary embodiment, the pointer icon is initially positioned at the center of the front touch screen display 122. The pointer icon may be, for example, a static image such as a translucent disk or pointer or an animated image such as a blinking, rotating, or color-changing graphic. In some implementations, the pointer icon is different from other pointer icons that may be displayed while the device is in the default touch pad mode. Alternately, another type of icon (e.g., a green LED) may be displayed on the rear touch pad 142 or elsewhere on the housing 110 to indicate that the current mode is the navigation touch pad mode.

In step 450, the device 100 monitors the inputs on the front touch screen display 122 and the rear touch pad 142. If the device 100 detects a second predetermined touch input on the front touch screen display 122 or the rear touch pad 142, the navigation mode is canceled and the flow diagram 400 returns to step 410 to operate in the default mode. In one exemplary embodiment, any touch input on the front touch screen display 122 may form the second predetermined touch input. This touch on the front touch screen display 122 may be intentional (e.g., touching a displayed icon to launch an application) or inadvertent (e.g., touching an inactive area of the front touch screen). In the either of these cases, the touch on the front touch screen display 122 is also a cancellation input. Another example of the second predetermined touch input may be a specific cancellation gesture such as another "figure 8" or double tap on the rear touch pad 142. Similarly, if no input is received for a predetermined period of time, the navigation mode is canceled in step 450 and the flow diagram 400 returns to step 410. The predetermined period of inactivity may be, for example, 5 seconds, 10 seconds, or any suitable preset, user-selectable, or user-adjustable time period. Upon cancellation of the navigation mode, the special pointer icon on the rear touch pad 142 or front touch screen display 122 may be removed or changed.

If the navigation mode is not canceled in step 450, the flow diagram 400 proceeds to step 460 in which the device 100 operates in a navigation mode. As depicted in FIG. 4, step 460 provides examples of five functions for the rear touch pad 142 in parallel substeps 461, 462, 463, 464, and 465 that provide a contrast to similar inputs in substeps 411, 412, 413, 414, and 415. As described below, substeps 461, 462, 463, 464, and 465 enable navigation of images on the front touch screen display 122 via the rear touch pad 142, e.g., without obscuring the image on the front touch screen display 122. Substeps 461, 462, 463, 464, and 465 are merely examples of functions in the navigation mode. Not all of the functions depicted in FIG. 4 may be provided, and additional functions may be enabled (via the described or different touch gestures), depending on user preference or software application.

Using the examples from step 410, a finger glide corresponds to the first input; a single-finger extended glide corresponds to the second input; a double-finger glide corresponds to the third input; a tap corresponds to the fourth input; and a double tap corresponds to the fifth input. As such, in substep 461, a first type of touch input (e.g., a finger glide or movement) on the rear touch pad 142 functions to move the displayed pointer icon about a static or near-static image displayed on the front touch screen display 122. In substep 462, a second type of touch input (e.g., an extended single-finger glide) on the rear touch pad 142 functions to pan the image displayed on the front touch screen display 122. In this context, the panning functions to scroll the image displayed on the front touch screen display 122 at a reduced rate relative to the scrolling in the default mode of substep 412. In one exemplary embodiment, panning may move the image on the front touch screen display 122 at a rate of 1:2 or 1:3, as examples, relative to similar touch inputs in the default touch pad mode.

In substep 463, a third type of touch input (e.g., a double-finger glide) on the rear touch pad 142 functions to zoom in or out on the image displayed on the front touch screen display 122. In substep 464, a fourth type of touch input (e.g., a tap) functions to position a cursor for text input in a corresponding portion of the image displayed on the front touch screen display 122. In substep 465, a fifth type of touch input (e.g. a double tap) functions to select or execute (e.g., launch) a portion of an image displayed on the front touch screen display 122. For example, this input may select a hyperlink or execute an application when the pointer icon is positioned in the appropriate location on the image. Other types of input may include combination of inputs such as a "hold and glide" to direct drag-and-drop functionality to manipulate displayed icons or objects or such as an "extended press" that initiates a menu or dialog box.

In general, any type of functionality in the navigation mode may be provided, although the functionality is typically different from the functionality triggered by similar inputs in the default mode, as shown by a comparison between steps 410 and 460. In particular, the separate touch pad modes enable an improved experience for the user. In the default mode, the rear touch pad 142 has limited functionality which reduces the risk that inadvertent user touches may lead to unintended results yet allows the user to have freedom of movement within or between applications. In the navigation mode, additional functions are provided through the rear touch pad 142 based on multiple types of inputs that may be used to enhance the precision with which the user controls the device 100. In this example, the precision is enhanced by limiting the scope of the user's rear touch pad interaction during the navigation mode to an image that is fully or partially displayed within a single application.

After one of the touch inputs in step 460, the flow diagram 400 proceeds to step 470 in which the device 100 determines if the intended task in the navigation mode is complete. This determination may depend on the current application on the front touch screen display 122 or user preference. For example, during step 460 (e.g., substep 461), the user may position the icon displayed/shown on the front touch screen display 122. However, considering that the user typically positions the icon for a particular purpose, it may be assumed that this input does not complete the intended task of the user. In such a situation, the flow diagram 400 would return to step 450 and the device 100 would continue to monitor touch inputs in the navigation mode. Using a similar example, in substep 465, the user selects a portion of the image to execute a hyperlink. It may be assumed that the task of the user is completed with the selection and the flow diagram 400 returns to step 410 such that the device 100 further operates in the default mode.

Other examples of determinations of when tasks are complete include: when text entry is complete as determined by the selection of an "enter" or "submit" function using a physical button, a front touch screen gesture, or a rear touch pad gesture (e.g., a fifth input per substep 465), when an application is launched as determined by a physical button, a front touch screen gesture, or a rear touch pad gesture (e.g., a fifth input per substep 465), or when a "cancel" function is invoked using a physical button. An additional example of one suitable implementation is provided below.

Figure 8:
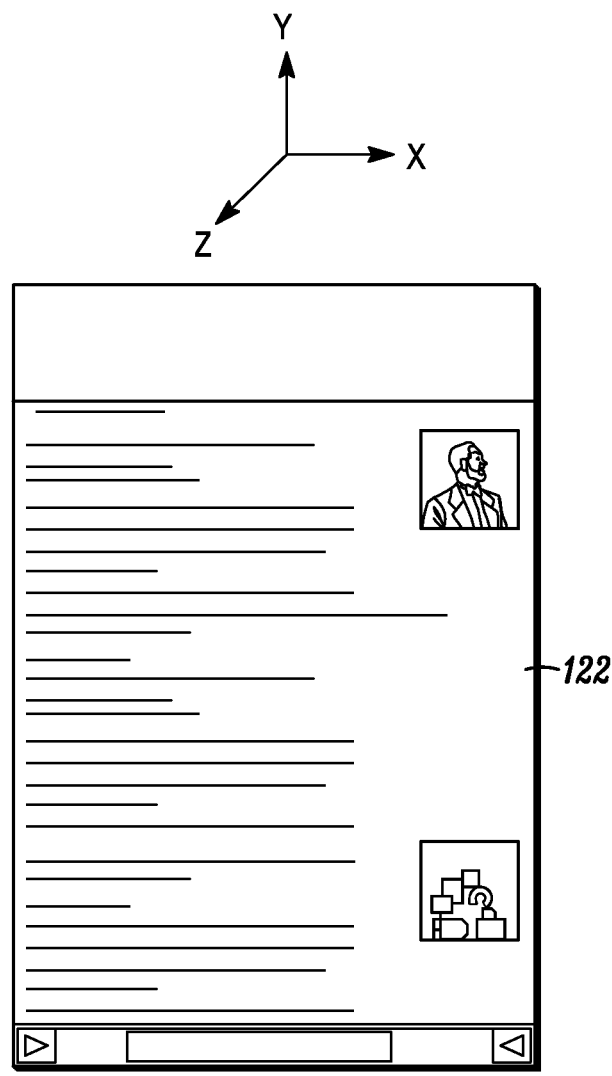
FIG. 8 is a schematic view of the electronic device displaying an image on a front touch screen display in the default mode as a user provides an input to a rear touch pad.
Figure 8:
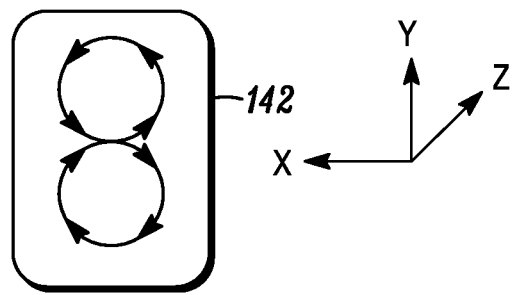
Figure 9:
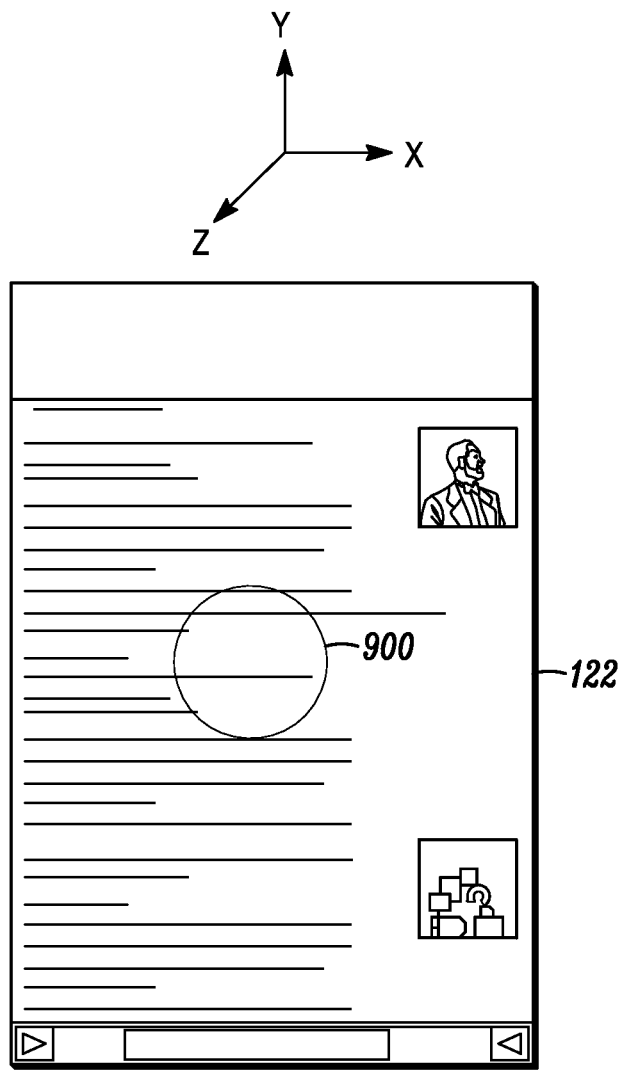
FIG. 9 is a schematic view of the electronic device in a navigation mode after the user input of FIG. 8.
Figure 9:
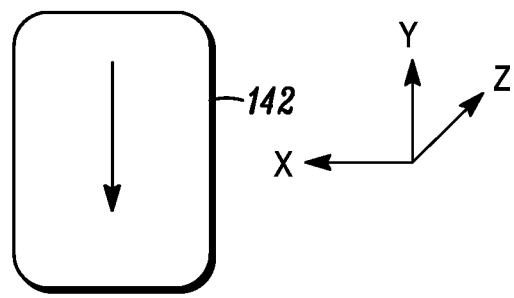

FIGS. 8-11 illustrate schematic representations of the front touch screen display 122 and the rear touch pad 142 during activation of the navigation mode and operation of the navigation mode (e.g., steps 410, 420, 430, 440, 450, 460, and 470 of flow diagram 400). For example, FIG. 8 illustrates the front touch screen display 122 displaying a website or electronic newspaper. In the default mode (e.g., as in step 410), inputs on the rear touch pad 142 scroll the displayed view up and down and side to side as also shown in FIGS. 5-7. However, as the user provides the first predetermined input on the rear touch pad 142, depicted as a "figure 8" in FIG. 8, the device 100 enables the navigation mode. FIG. 9 illustrates the front touch screen display 122 in the navigation mode and particularly illustrates the icon 900 that indicates activation of the navigation mode (in response to the gesture on the rear touch pad 142) and also serves as a reference point for subsequent inputs (e.g., as in steps 430, 440, and 440). As the icon 900 hovers over a selectable portion of the image, the portion may change in appearance. For example, in FIG. 9, a hyperlink is highlighted when the icon 900 hovers over the hyperlink. The highlighting may include one or more of color effects, outlining, haptic effects, sound effects, text effects, and changes to the icon 900, such as changing the icon 900 into a pointer or changing the icon's color.

Figure 10:
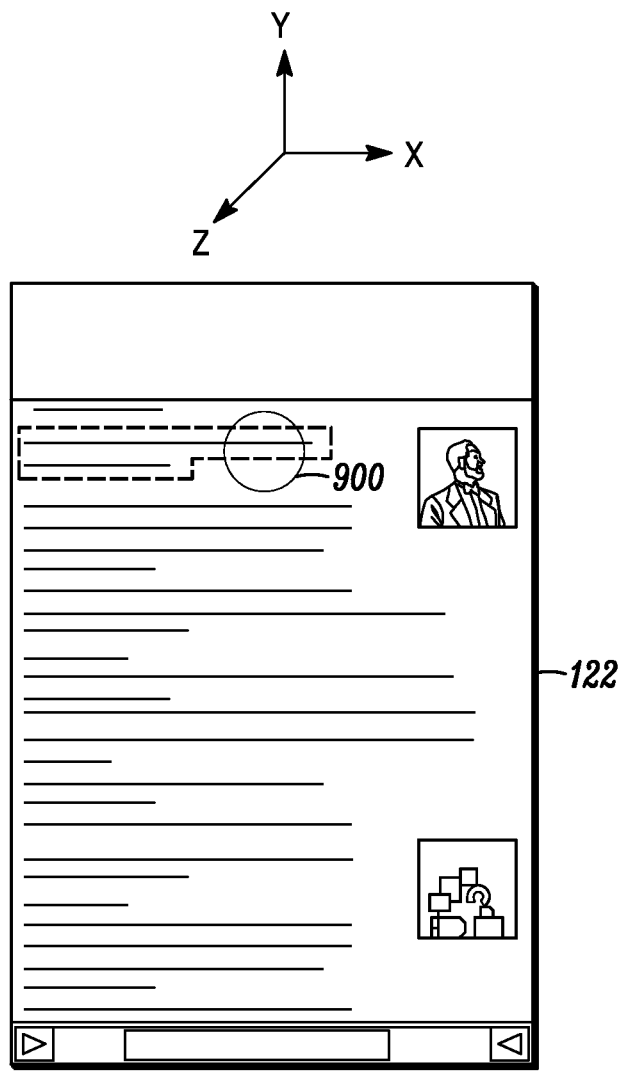
FIG. 10 is a schematic view of the electronic device in the navigation mode after the user input of FIG. 9.
Figure 10:
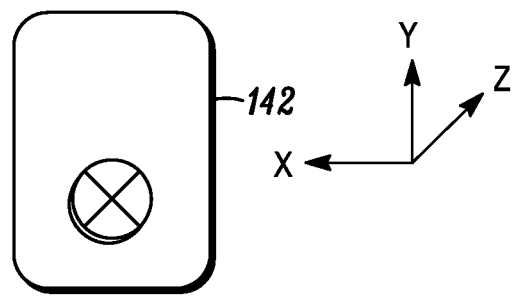

As shown in FIG. 9, the user may provide the first type of input to the rear touch pad 142 to position the icon 900. In this situation, a glide downward (in the negative y-axis direction) causes the icon to move up (in the positive y-axis direction) within the stable image displayed. FIG. 10 illustrates the image on the front touch screen display 122 resulting from the input of FIG. 9. Particularly, the icon in FIG. 10 has moved relative to the position in FIG. 9 in accordance with the sliding user input on the rear touch pad 142.

Figure 11:
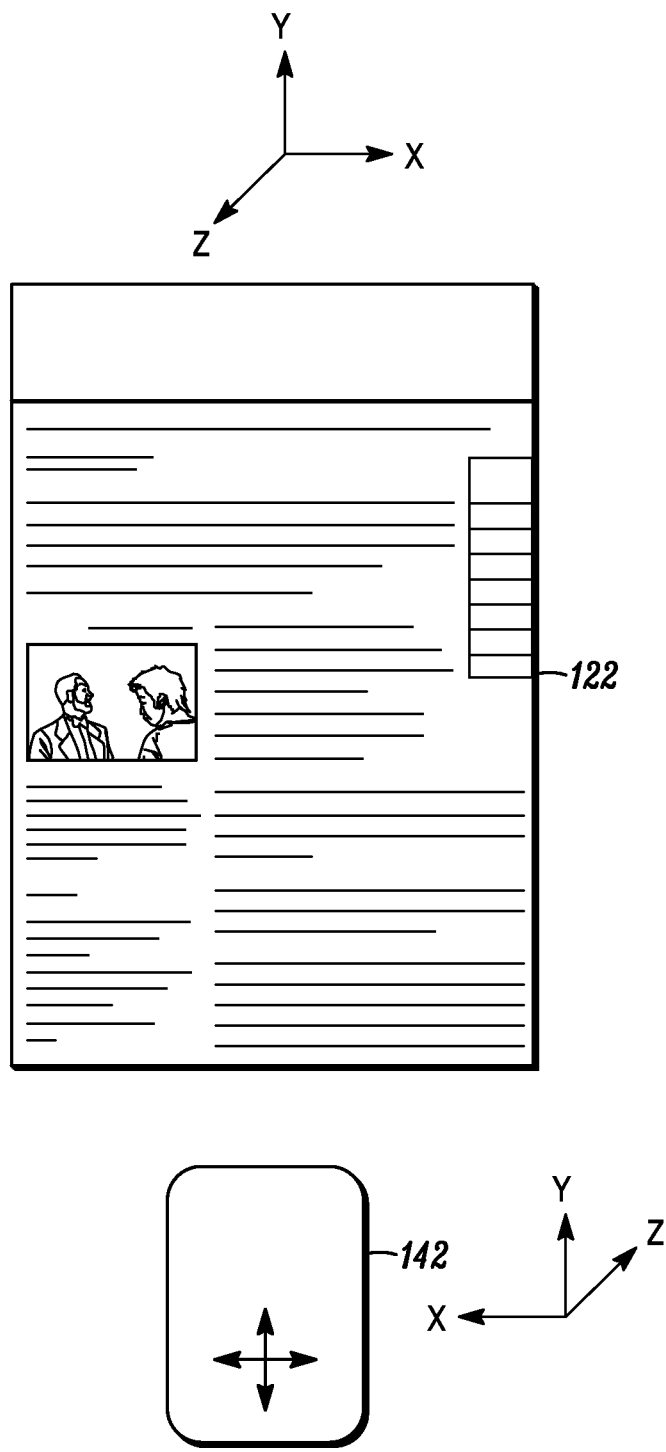
FIG. 11 is a schematic view of the electronic device in the default mode after the user input of FIG. 10.

In accordance with an exemplary embodiment, a selectable or executable portion of the image may be highlighted when the icon 900 hovers over the portion, as is shown in FIG. 10 when the icon 900 is positioned over a hyperlink. In this position, the user may provide another type of input such as a double tap (e.g., substep 465) on the rear touch pad 142. FIG. 11 illustrates the result of this type of input in FIG. 10. FIG. 11 includes a view of the image on the front touch screen display 122 after selecting the hyperlink in FIG. 10. In particular, the electronic newspaper article associated with the link is displayed in FIG. 11. In this exemplary embodiment of FIG. 11, the device 100 considers the intended task complete and returns to the default mode in which the image on the front touch screen display 122 may be scrolled with inputs on the rear touch pad 142 as also shown in FIGS. 5-7. As shown in FIG. 11, upon cancellation of the navigation mode, the icon is removed.

Accordingly, exemplary embodiments discussed herein may provide an improved and more intuitive experience for the user. The default and navigation modes enable improved functionality at the rear touch pad while reducing the risk of inadvertent inputs via the rear touch pad. As an example, the user may only perform a selection function on the rear touch pad in the navigation mode, thereby preventing inadvertent selection in the primary, default mode. Two particular examples include text or message editing and reading an electronic newspaper. Operating in the default mode enables scrolling of the message or newspaper via rear touch pad interactions, and upon entry of the first predetermined input, the device activates the navigation mode. In the navigation mode, the user may place a cursor for editing the message or select a hyperlink using the rear touch pad such that the user's finger performing these functions does not obscure the front touch screen display. When a particular task is completed (or when a timeout has occurred), the default mode is reactivated. The default and navigation modes may be used for any suitable application on the electronic device.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

As understood by those in the art, controller 300 includes a processor that executes computer program code to implement the methods described herein. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

What is claimed is:

1. A method in a user interface of an electronic device comprising a first touch-sensitive surface including a display on a first side and a second touch-sensitive surface on a second side, the method comprising:
   operating the electronic device in a default mode;
   receiving a predetermined first touch input while in the default mode;
   operating the electronic device in a navigation mode based on the receiving the predetermined first touch input, wherein the navigation mode includes displaying an image on the first touch-sensitive surface including a display and providing an icon for indicating a reference position on the first touch-sensitive surface including a display;

navigating through the image on the first touch-sensitive surface including a display based on a further touch input on the second touch-sensitive surface while in the navigation mode, wherein the navigating includes controlling the position of the icon on the first touch-sensitive surface including a display at a default rate when the further touch input is on the first touch-sensitive surface and controlling the position of the icon at a different rate when the further touch input is on the second touch-sensitive surface; and disabling the navigation mode on the second touch-sensitive surface and operating the electronic device in the default mode based on a predetermined second touch input.

2. The method of claim 1, wherein the receiving a predetermined first touch input comprises:
receiving the predetermined first touch input on the second touch-sensitive surface.

3. The method of claim 1, wherein the disabling includes:
disabling the navigation mode on the second touch-sensitive surface based on the predetermined second touch input on the second touch-sensitive surface.

4. The method of claim 3, wherein the predetermined second touch input triggers at least one of a hyperlink, a text entry, or an application launch prior to disabling the navigation mode.

5. The method of claim 1, wherein the disabling includes:
disabling the navigation mode on the second touch-sensitive surface based on the predetermined second touch input on the first touch-sensitive surface.

6. The method of claim 1, further comprising:
disabling the navigation mode on the second touch-sensitive surface after a predetermined time period of touch inactivity.

7. The method of claim 1, wherein the navigating further comprises:
highlighting a selectable portion of the image when the icon hovers over the selectable portion of the image.

8. The method of claim 7, wherein the highlighting includes:
providing at least one of: a color effect, a haptic effect, a text effect, a sound effect, or a different icon shape.

9. The method of claim 1, wherein the further touch input includes at least one of: a single-finger glide input, a multi-finger glide input, a tap input, or a multiple tap input.

10. The method of claim 1, wherein the navigating includes:
selecting a selectable portion of the image on the first touch-sensitive surface including a display.

11. The method of claim 10, wherein the selecting includes:
selecting the selectable portion of the image when the icon hovers over the selectable portion of the image on the first touch-sensitive surface including a display; and
the further touch input includes at least one of: a press-and-hold input or a multiple tap input on the second touch-sensitive surface.

12. The method of claim 10, further comprising:
removing the icon upon receiving the predetermined second touch input.

13. The method of claim 1 wherein the operating the electronic device in the default mode includes scrolling with respect to the image on the first touch-sensitive surface including a display based on the further touch input on the second touch-sensitive surface.

14. The method of claim 13, wherein the navigation mode on the second touch-sensitive surface is a panning mode such that the navigating through the image on the first touch-sensitive surface including a display based on the further touch input on the second touch-sensitive surface includes panning the image.

15. The method of claim 13, wherein the navigation mode on the second touch-sensitive surface is a zoom mode such that the navigating through the image on the first touch-sensitive surface including a display based on the further touch input on the second touch-sensitive surface includes zooming the image.

16. The method of claim 13, wherein the navigation mode on the second touch-sensitive surface is a cursor positioning mode such that the navigating through the image on the first touch-sensitive surface including a display based on the further touch input on the second touch-sensitive surface includes positioning a cursor on the image.

17. The method of claim 13, wherein the navigation mode on the second touch-sensitive surface is a selection mode such that the navigating through the image on the first touch-sensitive surface including a display based on the further touch input on the second touch-sensitive surface includes selecting a portion of the image.

18. The method of claim 13, wherein the navigation mode on the second touch-sensitive surface is an icon mode such that the navigating through the image on the first touch-sensitive surface including a display based on the further touch input on the second touch-sensitive surface includes positioning an icon with relative to the image.

19. An electronic device, comprising:
a housing having a first side and a second side;
a first touch-sensitive surface including a display on the first side;
a second touch-sensitive surface on the second side; and
a controller, coupled to the first touch-sensitive surface including a display and the second touch-sensitive surface, wherein the controller is configured to
operate in a default mode,
operate the electronic device in a navigation mode upon receiving a predetermined first touch input, wherein the navigation mode includes displaying an image on the first touch-sensitive surface including a display and provide an icon for indicating a reference position on the first touch-sensitive surface including a display;
enable a user to navigate through the image on the first touch-sensitive surface based on at least a further touch input, wherein the navigating includes controlling the position of the icon on the first touch-sensitive surface including a display at a default rate when the further touch input is on the first touch-sensitive surface and controlling the position of the icon at a different rate when the further touch input is on the second touch-sensitive surface, and
disable the navigation mode on the second touch-sensitive surface upon receiving a predetermined second touch input.

20. The electronic device of claim 19, wherein the controller is further configured to disable the navigation mode after a predetermined time period of inactivity.

21. The method of claim 1, wherein controlling, while in the navigation mode, the position of the icon on the first touch-sensitive surface including a display at a different rate comprises:

controlling the position of the icon at a rate different than a rate of controlling the position of the icon in the default mode.

\* \* \* \* \*